(12) United States Patent
Hong et al.

(10) Patent No.: US 10,930,934 B2
(45) Date of Patent: Feb. 23, 2021

(54) POSITIVE ACTIVE MATERIAL FOR RECHARGEABLE LITHIUM BATTERY AND RECHARGEABLE LITHIUM BATTERY INCLUDING SAME

(71) Applicant: SAMSUNG SDI CO., LTD., Yongin-si (KR)

(72) Inventors: Ming-Zi Hong, Yongin-si (KR);
Ki-Hyun Kim, Yongin-si (KR);
Do-Hyung Park, Yongin-si (KR);
Jung-Min Han, Yongin-si (KR);
Jae-Ho Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 114 days.

(21) Appl. No.: 16/198,081

(22) Filed: Nov. 21, 2018

(65) Prior Publication Data

US 2019/0097238 A1   Mar. 28, 2019

Related U.S. Application Data

(62) Division of application No. 15/401,188, filed on Jan. 9, 2017, now Pat. No. 10,153,492.

(30) Foreign Application Priority Data

Jan. 13, 2016 (KR) .................. 10-2016-0004195
Jan. 5, 2017 (KR) .................. 10-2017-0001920

(51) Int. Cl.
*H01M 4/02* (2006.01)
*H01M 4/62* (2006.01)
(Continued)

(52) U.S. Cl.
CPC .......... *H01M 4/628* (2013.01); *H01M 4/366* (2013.01); *H01M 4/525* (2013.01); *H01M 10/052* (2013.01); *H01M 2004/028* (2013.01)

(58) Field of Classification Search
CPC ....................................... H01M 4/02
See application file for complete search history.

(56) References Cited

U.S. PATENT DOCUMENTS

2009/0121198 A1   5/2009   Kajiya et al.
2014/0056797 A1   2/2014   Kabe et al.
(Continued)

FOREIGN PATENT DOCUMENTS

KR   10-0877092 B1   1/2009
KR   10-2014-0082189 A   7/2014
WO   WO 2012/147767 A1   11/2012

OTHER PUBLICATIONS

Seki et al. ("Fabrication of High-Voltage, High-Capacity All-Solid-State Lithium Polymer Secondary Batteries by Application of the Polymer Electrolyte/Inorganic Electrolyte Composite Concept" Chem. Mater. 2005, 17, 2041-2045).*

*Primary Examiner* — Jacob B Marks
(74) *Attorney, Agent, or Firm* — Lee IP Law, P.C.

(57) ABSTRACT

A positive active material for a rechargeable lithium battery including a lithium metal compound and a phosphorus (P)-containing compound on the surface of the lithium metal compound. A content of phosphorus (P) of the phosphorus-containing compound is about 0.1 atom % to about 10 atom % based on the total amount of elements on the surface of the positive active material. A method of preparing the same and rechargeable lithium battery including the same are also provided.

6 Claims, 6 Drawing Sheets

(51) Int. Cl.
*H01M 4/36* (2006.01)
*H01M 4/525* (2010.01)
*H01M 10/052* (2010.01)

(56) References Cited

U.S. PATENT DOCUMENTS

2016/0036049 A1    2/2016   Wang et al.
2016/0351898 A1*   12/2016   Fang .................. H01M 4/5825

* cited by examiner

X-axis: Bonding energy(eV)
Y-axia: Intensity(a.u.)

POSITIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATIONS

This is a divisional application based on pending application Ser. No. 15/401,188, filed Jan. 9, 2017, the entire contents of which is hereby incorporated by reference.

Korean Patent Application Nos. 10-2016-0004195 and 10-2017-0001920, filed on Jan. 13, 2016, and Jan. 5, 2017, respectively, in the Korean Intellectual Property Office, and entitled: "Positive Active Material for Rechargeable Lithium Battery, Method of Preparing Same and Rechargeable Lithium Battery Including Same," are incorporated by reference herein in their entirety.

BACKGROUND

1. Field

Embodiments relate to positive active material for a rechargeable lithium battery, a method of preparing the same, and a rechargeable lithium battery including the same.

2. Description of the Related Art

Recent developments in high-tech electronics have allowed electronic devices to become small and light in weight and has led to an increase in portable electronic devices. The demand for batteries with high energy density as a power source for such portable electronic devices, has been increasing.

Such a rechargeable lithium battery is manufactured by injecting an electrolyte into an electrode assembly, which includes a positive electrode including a positive active material capable of intercalating/deintercalating lithium ions and a negative electrode including a negative active material capable of intercalating/deintercalating lithium ions.

SUMMARY

Embodiments are directed to a positive active material for a rechargeable lithium battery including a lithium metal compound and a phosphorus (P)-containing compound on the surface of the lithium metal compound. A content of phosphorus (P) of the phosphorus-containing compound is about 0.1 atom % to about 10 atom % based on the total amount of elements on the surface of the positive active material.

The phosphorus-containing compound may include lithium phosphate.

The phosphorus-containing compound may include $Li_3PO_4$, $Li_2HPO_4$, $LiH_2PO_4$, $LiMPO_4$ (M=Fe, Co, Mn, Ni, V, La, Ti, or Al), $(NH_4)_2HPO_4$, $(NH_4)H_2PO_4$, $AlPO_4$, $H_3PO_4$, or a combination thereof.

The lithium metal compound may include a lithium nickel-based oxide represented by Chemical Formula 1:

$$Li_xNi_yM_zO_2 \quad \text{[Chemical Formula 1]}$$

wherein, M is Co, Mn, Al, Mg, Ti, Zr, or a combination thereof, $0.95 \leq x \leq 1.00$, $0.4 \leq y \leq 1.00$, $0 \leq z \leq 0.6$, and $y+z=1$.

Embodiments are also directed to a method of preparing a positive active material for a rechargeable lithium battery including washing a first active material with an aqueous solution of a phosphorus (P)-containing material to obtain a second active material. The first active material includes a lithium metal compound and a lithium compound present on the surface of the lithium metal compound, the lithium metal compound is different from the lithium compound. The second active material includes the lithium metal compound and a phosphorus-containing compound present on the surface of the lithium metal compound.

The aqueous solution of the phosphorus-containing material may be an aqueous solution including a phosphoric acid, a phosphate salt, or a combination thereof.

The phosphate salt may include $Li_3PO_4$, $Li_2HPO_4$, $LiH_2PO_4$, $LiMPO_4$ (M=Fe, Co, Mn, Ni, V, La, Ti, or Al), $(NH_4)_2HPO_4$, $(NH_4)H_2PO_4$, $AlPO_4$, $H_3PO_4$, or a combination thereof.

The phosphorus-containing material may be used in an amount of about 0.01 parts by mole to about 20 parts by mole based on 100 parts by mole of the first active material.

A concentration of the phosphorus-containing aqueous solution may be about 0.01M to about 10M.

The lithium metal compound may include a lithium nickel-based oxide represented by Chemical Formula 1:

$$Li_xNi_yM_zO_2 \quad \text{[Chemical Formula 1]}$$

wherein, M is Co, Mn, Al, Mg, Ti, Zr, or a combination thereof, $0.95 \leq x \leq 1.00$, $0.4 \leq y \leq 1.00$, $0 \leq z \leq 0.6$, and $y+z=1$.

The lithium compound may include $Li_2CO_3$, LiOH, or a combination thereof.

Embodiments are also directed to a rechargeable lithium battery including the positive electrode including a positive active material.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
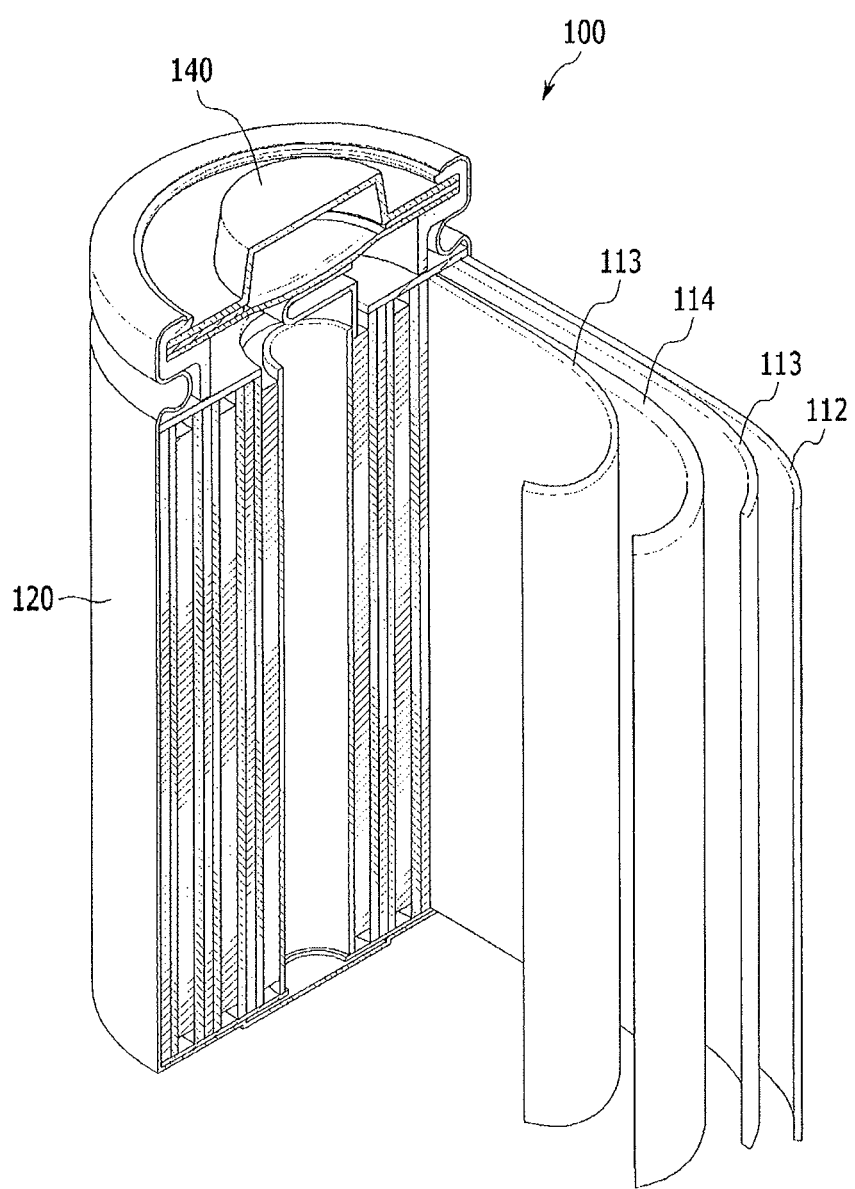
FIG. 1 illustrates a schematic view of a rechargeable lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration.

A positive active material for a rechargeable lithium battery according to an embodiment includes a lithium metal compound and a phosphorus (P)-containing compound on the surface of the lithium metal compound.

The lithium metal compound may be a compound including lithium and another metal. For example, the lithium metal compound may be a lithium nickel-based oxide. For example, the lithium nickel-based oxide may be represented by Chemical Formula 1.

$Li_xNi_yM_zO_2$  [Chemical Formula 1]

In Chemical Formula 1, M is Co, Mn, Al, Mg, Ti, Zr, or a combination thereof, $0.95 \leq x \leq 1.00$, $0.4 \leq y \leq 1.00$, $0 \leq z \leq 0.6$, and $y+z=1$. As examples, y may be in the following ranges: $0.5 \leq y \leq 1.00$, $0.6 \leq y \leq 1.00$, or $0.7 \leq y \leq 1.00$.

When the lithium nickel-based oxide represented by Chemical Formula 1, for example, when a lithium nickel-based oxide including nickel in a large amount is used as a positive active material, a rechargeable lithium battery having excellent electrochemical characteristics such as rate capability and the like as well as high capacity may be realized.

The phosphorus-containing compound may be disposed on the surface of the lithium metal compound. The phosphorus-containing compound may be formed on the surface of lithium metal compound by washing a synthesized lithium metal compound with a phosphorus (P)-containing aqueous solution. A method of preparing the positive active material through the washing will be described below. For example, the phosphorus-containing compound may be formed through a reaction of a lithium compound remaining on the surface after synthesis of the lithium metal compound with a phosphorus-containing aqueous solution used for washing. When the phosphorus-containing compound is formed on the surface of the lithium metal compound, capacity characteristics and cycle-life characteristics of a rechargeable lithium battery may be improved. When the amount of lithium remaining on the surface after synthesis of the lithium metal compound is reduced, the amount of gas generated during charge and discharge of a rechargeable lithium battery may be reduced.

The lithium compound may include $Li_2CO_3$, LiOH, or a combination thereof, as examples.

The phosphorus-containing compound present on the surface of the lithium metal compound may include lithium phosphate.

The lithium phosphate may include, for example, $Li_3PO_4$, $Li_2HPO_4$, $LiH_2PO_4$, $LiMPO_4$ (M=Fe, Co, Mn, Ni, V, La, Ti, or Al), $(NH_4)_2HPO_4$, $(NH_4)_2HPO_4$, $AlPO_4$, $H_3PO_4$, or a combination thereof.

A content of phosphorus (P) in the phosphorus-containing compound may be about 0.01 atom % to about 10 atom %, or, for example, about 0.01 atom % to about 9 atom %, about 0.01 atom % to about 8 atom %, about 0.01 atom % to about 7 atom %, about 0.01 atom % to about 6 atom %, about 0.01 atom % to about 5 atom %, about 0.05 atom % to about 10 atom %, about 0.1 atom % to about 10 atom %, about 0.5 atom % to about 10 atom %, or about 1 atom % to about 10 atom % based on the total amount of elements on the surface of the positive active material When a phosphorus (P) element on the surface of the lithium metal compound is within the content range, a rechargeable lithium battery exhibiting high capacity and excellent cycle-life characteristics and also, improved stability due to the reduced amount of generated gas may be realized. The content of the phosphorus may be adjusted by changing the amount, concentration, or the like of a phosphorus-containing aqueous solution used for washing during preparation of the positive active material. The valence of the phosphorus element may be measured through an X-ray photoelectron spectroscopy (XPS) analysis with respect to the surface of the positive active material.

The phosphorus-containing compound may be present in an amount of about 0.01 parts by weight to about 10 parts by weight, or for example, about 0.01 parts by weight to about 9 parts by weight, about 0.01 parts by weight to about 8 parts by weight, about 0.01 parts by weight to about 7 parts by weight, about 0.01 parts by weight to about 6 parts by weight, about 0.01 parts by weight to about 5 parts by weight, about 0.05 parts by weight to about 10 parts by weight, about 0.1 parts by weight to about 10 parts by weight, or about 0.2 parts by weight to about 10 parts by weight based on 100 parts by weight of the lithium metal compound. The weight range of the phosphorus-containing compound may be measured through an inductively coupled plasma (ICP) light-emitting spectroscopy analysis. When the phosphorus-containing compound within the content range is present on the surface of the lithium metal compound, a rechargeable lithium battery having excellent stability as well as showing high capacity and cycle-life characteristics may be realized.

On the surface of the lithium metal compound, a lithium compound other than the phosphorus-containing compound may remain on the surface after synthesis of the lithium metal compound.

Hereinafter, a method of preparing a positive active material according to another embodiment is illustrated.

The positive active material may be prepared by obtaining a second active material through washing a first active material with an aqueous solution of a phosphorus (P)-containing material. The second active material constitutes a positive active material according to the one embodiment.

The first active material may be obtained after synthesizing the lithium metal compound. A lithium compound may remain on the surface of the synthesized lithium metal compound. The first active material may include the lithium metal compound and the lithium compound present on the surface of the lithium metal compound.

When the first active material obtained after synthesis of the lithium metal compound is washed with an aqueous solution of a phosphorus-containing material, the lithium compound remaining on the surface of the lithium metal compound may react with the aqueous solution of the phosphorus-containing material and form the above-described phosphorus-containing compound, reducing the amount of residual lithium. The aqueous solution of the phosphorus-containing material used for washing may minimize the active material change of the lithium metal compound and may reduce the amount of the residual lithium. Thus, battery stability due to a decreased amount of generated gas as well as electrochemical characteristics such as capacity characteristics and cycle-life characteristics may be improved.

The lithium metal compound may be a lithium nickel-based oxide. For example, the lithium metal compound may be the compound represented by Chemical Formula 1 as described above. The lithium nickel-based oxide may be synthesized by a suitable method known.

The aqueous solution of the phosphorus-containing material may be an aqueous solution including a phosphoric acid, a phosphate salt, or a combination thereof. Examples of the phosphate salt may be $Li_3PO_4$, $Li_2HPO_4$, $LiH_2PO_4$, $LiMPO_4$ (M=Fe, Co, Mn, Ni, V, La, Ti, or Al), $(NH_4)_2HPO_4$, $(NH_4)H_2PO_4$, $AlPO_4$, $H_3PO_4$, or a combination thereof.

A use amount of the phosphorus-containing material for the washing process may be about 0.01 parts by mole to about 20 parts by mole, or for example, about 0.01 parts by mole to about 19.5 parts by mole, about 0.01 parts by mole to about 19 parts by mole, about 0.01 parts by mole to about 18 parts by mole, about 0.01 parts by mole to about 17 parts by mole, about 0.01 parts by mole to about 16 parts by mole, about 0.01 parts by mole to about 15 parts by mole, about 0.01 parts by mole to about 14 parts by mole, about 0.01 parts by mole to about 13 parts by mole, about 0.01 parts by mole to about 12 parts by mole, about 0.01 parts by mole to about 11 parts by mole, about 0.01 parts by mole to about 10 parts by mole, about 0.01 parts by mole to about 9 parts by mole, about 0.01 parts by mole to about 8 parts by mole, about 0.01 parts by mole to about 7 parts by mole, about 0.01 parts by mole to about 6 parts by mole, about 0.01 parts by mole to about 5 parts by mole, about 0.05 parts by mole to about 10 parts by mole, about 0.1 parts by mole to about 10 parts by mole, or about 0.2 parts by mole to about 10 parts by mole based on 100 parts by mole of the first active material. When the phosphorus-containing material is used within the range, a phosphorus-containing compound such as $Li_3PO_4$ may be formed on the surface of the lithium metal compound and thus may contribute to improving capacity characteristics and cycle-life characteristics of a rechargeable lithium battery. In addition, a positive active material including a phosphorus (P) element within an appropriate atom % range on the surface of the lithium metal compound may realize a rechargeable lithium battery having high capacity, excellent cycle-life characteristics, and stability.

A concentration of the aqueous solution of the phosphorus-containing material may be about 0.01 M to about 10 M, or, for example, about 0.01M to about 9 M, about 0.01 M to about 8 M, about 0.01 M to about 7 M, about 0.01 M to about 6 M, about 0.01 M to about 5 M, about 0.05 M to about 10 M, about 0.1 M to about 10 M, or about 0.2 M to about 10 M. When the aqueous solution of the phosphorus-containing material used for washing is used within the concentration range, a positive active material capable of realizing a rechargeable lithium battery having high capacity and excellent cycle-life characteristics and stability may be prepared.

After the washing, a drying process may be further performed. The drying may be performed through a heat-treatment at about 100° C. to about 800° C. for about 1 hour to about 20 hours.

Hereinafter, a rechargeable lithium battery according to an embodiment is illustrated referring to FIG. 1.

FIG. 1 is a schematic view showing a rechargeable lithium battery according to an embodiment. Referring to FIG. 1, a rechargeable lithium battery 100 according to an embodiment may include an electrode assembly including a positive electrode 114, a negative electrode 112 facing the positive electrode 114, a separator 113 interposed between the positive electrode 114 and the negative electrode 112, and an electrolyte solution impregnating the positive electrode 114, the negative electrode 112, and the separator 113, a battery case 120 including the electrode assembly, and a sealing member 140 sealing the battery case 120.

The positive electrode 114 may include a current collector and a positive active material layer formed on the current collector. The positive active material layer may include a positive active material, a binder and optionally a conductive material.

The current collector may include Al, as an example.

The positive active material may be the same as described above.

The binder may improve binding properties of positive active material particles with one another and with a current collector. Specific examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material improves the conductivity of an electrode. A suitable electrically conductive material that does not cause a chemical change may be used. Examples thereof may include one or more of natural graphite, artificial graphite, carbon black, acetylene black, ketjen black, a carbon fiber, a metal powder, a metal fiber, and the like of copper, nickel, aluminum, silver, or the like, a conductive material such as a polyphenylene derivative or the like.

The negative electrode 112 may include a current collector and a negative active material layer formed on the current collector.

The current collector may include Cu, as an example.

The negative active material layer may include a negative active material, a binder, and optionally, a conductive material.

The negative active material may be a material that reversibly intercalates/deintercalates lithium ions, a lithium metal, a lithium metal alloy, a material being capable of doping and dedoping lithium, or transition metal oxide.

The material that reversibly intercalates/deintercalates lithium ions may be a carbon material such as a generally-used carbon-based negative active material rechargeable lithium battery. Examples thereof may include crystalline carbon, amorphous carbon, or a mixture thereof. Examples of the crystalline carbon may include graphite such as amorphous, sheet-shape, flake, spherical shape or fiber-shaped natural graphite or artificial graphite. Examples of the amorphous carbon may include soft carbon or hard carbon, a mesophase pitch carbonized product, fired coke, or the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping and dedoping lithium may be Si, $SiO_x$ (0<x<2), a Si—C composite, a Si-Q alloy (herein, the Q is an element selected from an alkali metal, an alkaline-earth metal, Group 13 to 16 elements, a transition metal, a rare earth element, and a combination thereof, and not Si), Sn, $SnO_2$, a Sn—C composite, Sn—R (herein, the R is an element selected from an alkali metal, an alkaline-earth metal, Group 13 to 16 elements, a transition metal, a rare earth element, and a combination thereof, and not Sn), or the like, and at least one of these may be mixed with $SiO_2$. Specific examples of the Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide, or the like.

The binder improves binding properties of negative active material particles with one another and with a current collector. Examples of the binder may include polyvinyl alcohol, carboxymethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material improves electrical conductivity of an electrode. A suitable electrically conductive material that does not cause a chemical change may be used as the conductive material. Examples thereof include a carbon-based material such as natural graphite, artificial graphite, carbon black, acetylene black, ketjen black, a carbon fiber, or the like; a metal-based material such as a metal powder or a metal fiber or the like of copper, nickel, aluminum, silver, or the like; a conductive polymer such as a polyphenylene derivative or the like; or a mixture thereof.

The negative electrode 112 and the positive electrode 114 may be manufactured by a method including mixing each active material, a binder, and a conductive material to provide an active material composition, and coating the active material composition on a current collector. The solvent may be an organic solvent such as N-methylpyrrolidone or the like, or may be an aqueous solvent such as water or the like in accordance with the kind of a binder The electrolyte solution may include an organic solvent and a lithium salt.

The organic solvent may serve as a medium for transmitting ions taking part in the electrochemical reaction of the battery. The organic solvent may be selected from a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

For example, when a linear carbonate compound and a cyclic carbonate compound are mixed, a solvent having a high dielectric constant and low viscosity may be provided. The cyclic carbonate compound and linear carbonate compound may be mixed in a volume ratio of about 1:1 to about 1:9.

The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran, or the like. Examples of the ketone-based solvent include cyclohexanone or the like. The alcohol-based solvent may include ethyl alcohol, isopropyl alcohol, or the like.

The organic solvent may be used singularly or in a mixture. When the organic solvent is used in a mixture, the mixture ratio may be controlled in accordance with a desirable battery performance.

The electrolyte solution may further include an additive such as an overcharge inhibiting agent such as ethylenecarbonate, pyrocarbonate, or the like.

The lithium salt may be dissolved in an organic solvent. The lithium salt supplies a battery with lithium ions, basically operates the rechargeable lithium battery, and improves transportation of the lithium ions between positive and negative electrodes.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, e.g., an integer of 1 to 20), LiCl, LiI, and $LiB(C_2O_4)_2$ (lithium bis(oxalato)borate; LiBOB).

The lithium salt may be used in a concentration ranging from about 0.1 M to about 2.0 M. When the lithium salt is included at the above concentration range, an electrolyte may have optimal electrolyte conductivity and viscosity, and may thus have enhanced performance and effective lithium ion mobility.

The separator 113 may include separating suitable material that separates a negative electrode 112 from a positive electrode 114 and provides a transporting passage of lithium ions. The separator may have a low resistance to ion transport and an excellent impregnatability for electrolyte solution. For example, the material for the separator 113 may be selected from a glass fiber, polyester, polyethylene, polypropylene, polytetrafluoroethylene (PTFE), or a combination thereof. The material for the separator 113 may have a form of a non-woven fabric or a woven fabric. For example, for the lithium ion battery, a polyolefin-based polymer separator such as polyethylene, polypropylene or the like may be used. In order to ensure sufficient heat resistance or mechanical strength, a coated separator including a ceramic component or a polymer material may be used. The separator 113 may have a mono-layered or multi-layered structure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation of Positive Active Material

Example 1

A $H_3PO_4$ aqueous solution was prepared in a concentration of 1M. 50 g of the synthesized $H_3PO_4$ aqueous solution was mixed with 50 g of $LiNi_{0.80}Co_{0.15}Al_{0.05}O_2$ of which a lithium compound including $Li_2CO_3$ and LiOH were presented on the surface thereof as a first active material, in a beaker. At this time, the amount of $H_3PO_4$ was 9.6 parts by mole based on 100 parts by mole of the first active material.

The mixture was stirred on a hot plate with a magnetic stirrer for 20 minutes. A material obtained therefrom was filtered, separated, and dried in a 120° C. oven for 12 hours, preparing a positive active material.

Example 2

A positive active material was prepared according to the same method as Example 1 except for using a 1M $(NH_4)_2HPO_4$ aqueous solution instead of the $H_3PO_4$ aqueous solution.

Example 3

A positive active material was prepared according to the same method as Example 1 except for using a 1M $AlPO_4$ aqueous solution instead of the $H_3PO_4$ aqueous solution.

Example 4

A positive active material was prepared according to the same method as Example 1 except for using a 1M Al $(NO_3)_3 \cdot 9H_2O$ and $(NH_4)_2HPO_4$ mixed aqueous solution (1:1 mole ratio) instead of the $H_3PO_4$ aqueous solution. The amount of mixture of $Al(NO_3)_3 \cdot 9H_2O$ and $(NH_4)_2HPO_4$ was 19.2 parts by mole based on 100 parts by mole of the first active material.

Example 5

A positive active material was prepared according to the same method as Example 1 except for using a 2M $H_3PO_4$ aqueous solution instead of the 1M $H_3PO_4$ aqueous solution.

Example 6

A positive active material was prepared according to the same method as Example 1 except for using 100 g of a $H_3PO_4$ aqueous solution instead of 50 g of the $H_3PO_4$ aqueous solution.

Comparative Example 1

A synthesized material, $LiNi_{0.85}Co_{0.10}Al_{0.05}O_2$, was used as a positive active material.

Comparative Example 2

A positive active material was prepared according to the same method as Example 1 except for using distilled water instead of the $H_3PO_4$ aqueous solution.

(Manufacture of Rechargeable Lithium Battery Cell)

92 wt % of each positive active material according to Examples 1 to 6 and Comparative Examples 1 and 2 was mixed with 4 wt % of polyvinylidene fluoride (PVdF) and 4 wt % of acetylene black, and the resultant mixture was dispersed into N-methyl-2-pyrrolidone, preparing a slurry. The slurry was coated onto an aluminum foil, dried, and compressed, manufacturing a positive electrode.

In manufacturing a coin-type half-cell, metal lithium was used as a counter electrode for the positive electrode. An electrolyte solution was prepared by dissolving 1.3M $LiPF_6$ in a mixed solvent of ethylene carbonate (EC), ethylmethyl carbonate (EMC), and dimethyl carbonate (DMC) (EC: EMC:DMC=3:4:3 of a volume ratio).

Evaluation 1: EDS Analysis of Positive Active Material

Figure 2:
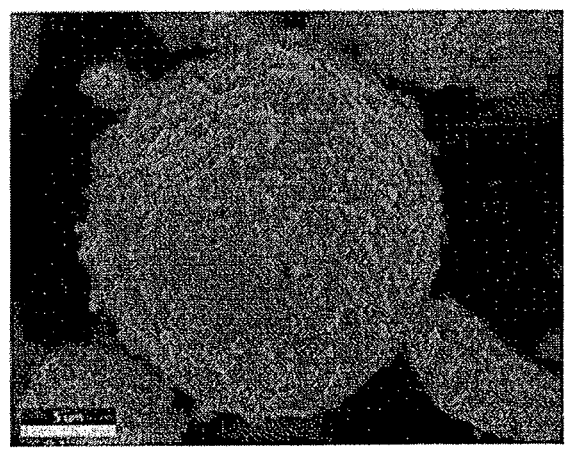
FIG. 2 illustrates an image showing the energy dispersive spectroscope (EDS) analysis of a positive active material according to Example 1 by using the scanning electron microscope (SEM) photograph of the positive active material.

FIG. 2 illustrates an image showing an energy dispersive spectroscope (EDS) analysis result of the positive active material according to Example 1. Referring to FIG. 2, the positive active material obtained through washing according to Example 1 had a phosphorus (P) element on the surface of the $LiNi_{0.80}Co_{0.05}Al_{0.05}O_2$ material including nickel in a large amount.

Evaluation 2: Cross-Sectional SIMS Analysis of Positive Active Material

Figure 3:
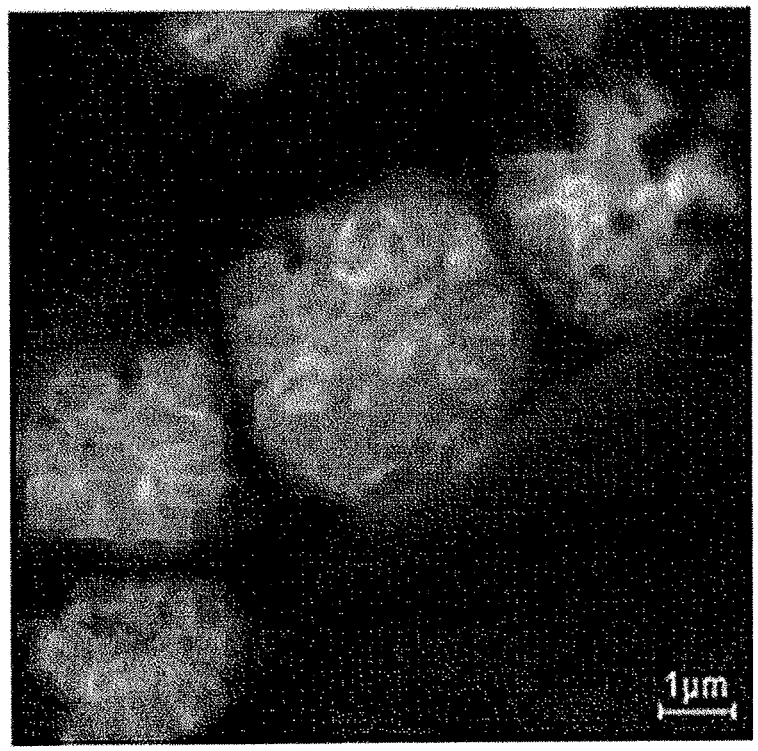
FIG. 3 illustrates an image showing the secondary ion mass spectroscopy (SIMS) analysis of the cross section of the positive active material according to Example 1.
Figure 4:
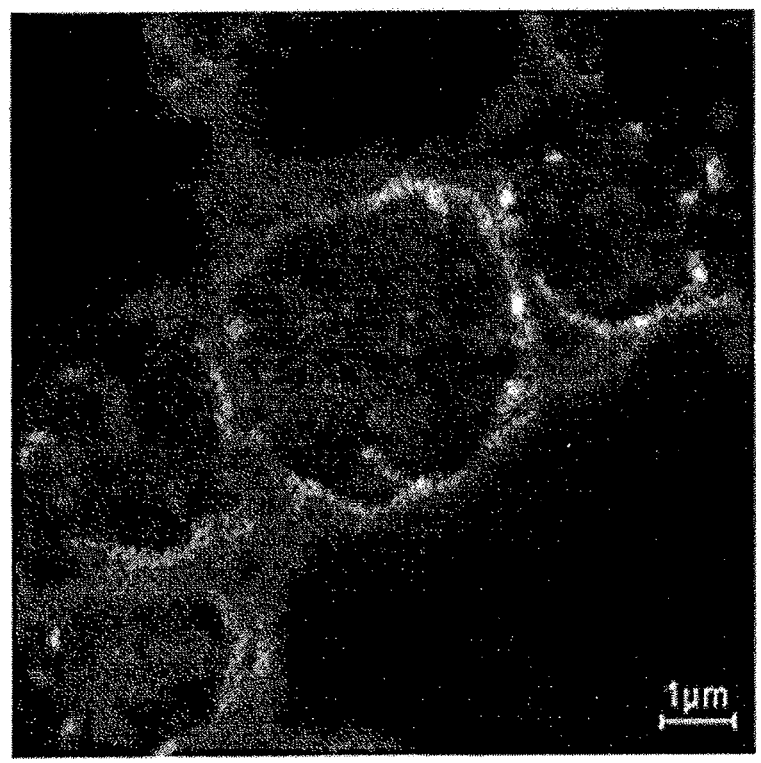
FIG. 4 illustrates an image showing a phosphorus (P) element mapping about the same region as shown in FIG. 3.

FIG. 3 illustrates an image showing a SIMS (Secondary Ion Mass spectroscopy) analysis result of the cross section of the positive active material according to Example 1, and FIG. 4 illustrates an image showing phosphorus (P) element mapping in the same region as FIG. 3. Referring to FIGS. 3 and 4, the positive active material obtained through washing according to Example 1 had a phosphorus (P) element on the surface of the $LiNi_{0.80}Co_{0.15}Al_{0.05}O_2$ material.

Evaluation 3: Surface XPS Analysis of Positive Active Material

Figure 5:
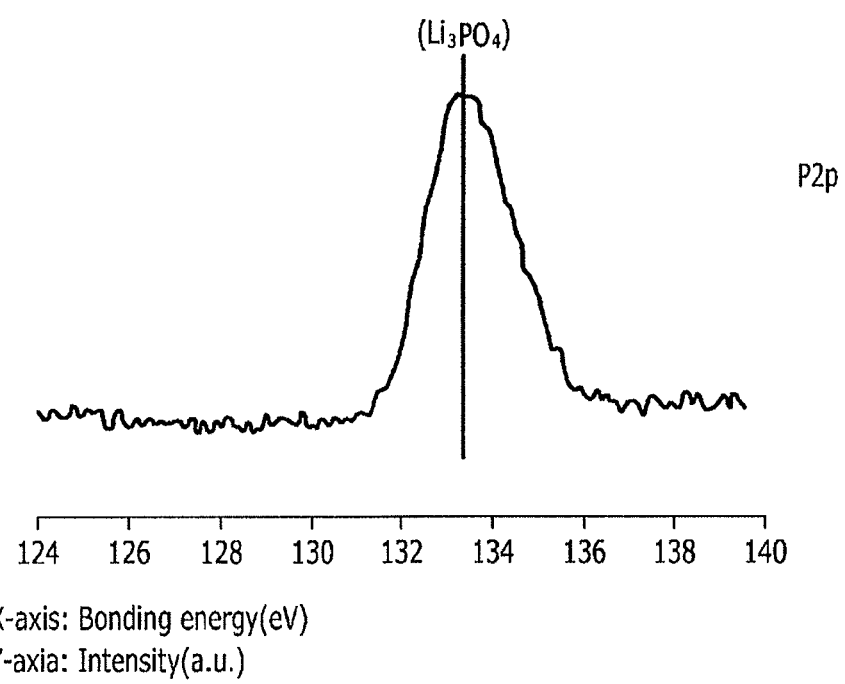
FIG. 5 illustrates a graph showing the X-ray photoelectron spectroscopy (XPS) analysis about the surface of the positive active material according to Example 1.

The surface of the positive active material according to Example 1 was analyzed in an X-ray photoelectron spectroscopy (XPS) method, and the results are provided in FIG. 5 and Table 1. Referring to FIG. 5, a $Li_3PO_4$ compound was formed on the surface of the positive active material obtained through washing according to Example 1.

Table 1 shows the composition of atoms on the surface of the positive active material according to Example 1.

TABLE 1

| Atom | Amount (atom %) |
|---|---|
| O | 43.9 |
| Li | 24.1 |
| C | 15.9 |
| P | 3.1 |
| Ni | 7.9 |
| Co | 1.8 |
| S | 2.7 |
| Al | 0.6 |

Referring to Table 1, a phosphorus (P) element was present in an amount of 3.1 atom % on the surface of the positive active material according to Example 1 and specifically, on the surface of a lithium metal compound.

Evaluation 4: Cycle-Life Characteristics of Rechargeable Lithium Battery Cell

Figure 6:
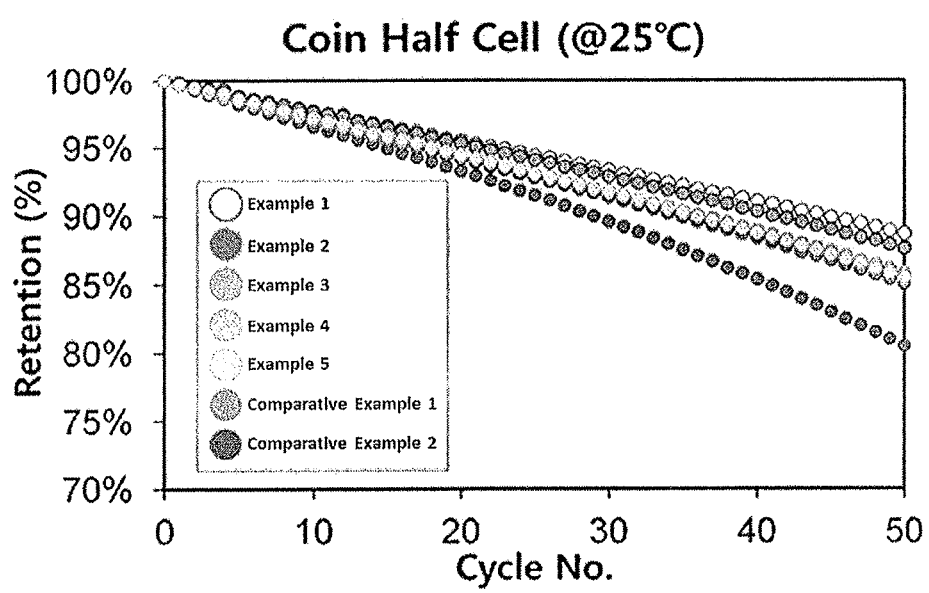
FIG. 6 illustrates a graph showing the cycle-life characteristics of rechargeable lithium battery cells according to Examples 1 to 5 and Comparative Examples 1 and 2.

Each rechargeable lithium battery cell according to Examples 1 to 6 and Comparative Examples 1 and 2 was repetitively 1 C charged and 1 C discharged, and cycle-life characteristics of the cell were evaluated and provided in FIG. 6.

Referring to FIG. 6, the cell manufactured by using the positive active material obtained through washing with a phosphorus (P)-containing aqueous solution according to Example 1 showed remarkably improved cycle-life characteristics compared with the cell manufactured by using the positive active material obtained through washing with distilled water according to Comparative Example 2.

By way of summation and review, a rechargeable lithium battery may be manufactured by injecting an electrolyte into an electrode assembly, which includes a positive electrode including a positive active material capable of intercalating/deintercalating lithium ions and a negative electrode including a negative active material capable of intercalating/deintercalating lithium ions.

As for the positive active material, $LiCoO_2$ is the most widely used. Recently, as the rechargeable lithium battery has been extensively used in various devices ranging from a portable information electronic device to an electric tool, a car, or the like, for which a high capacity, high power, and stability are desirable, research on improving performance of the $LiCoO_2$ and developing an alternative material such as a ternary component-based material and an olivine-based material has been actively carried out.

In particular, a lithium nickel-based oxide including nickel in a large amount may realize high capacity and show excellent electrochemical properties. However, when a large amount of lithium remains on the surface of the lithium nickel-based oxide, cycle characteristics and stability, of the lithium nickel-based oxide based rechargeable lithium battery may deteriorate, and the useable lifetime of the lithium nickel-based oxide may be shortened.

Embodiments provide a positive active material for a rechargeable lithium battery generating a small amount of gas and thus having excellent stability as well as showing high capacity and cycle-life characteristics.

Embodiments further provide a method of preparing the positive active material and a rechargeable lithium battery including the positive active material.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof the present invention as set forth in the following claims.

What is claimed is:

1. A positive active material for a rechargeable lithium battery, the positive active material comprising a lithium metal compound and a phosphorus (P)-containing compound on the surface of the lithium metal compound, wherein a content of phosphorus (P) of the phosphorus-containing compound is about 0.1 atom % to about 10 atom % based on the total amount of elements on the surface of the positive active material.

2. The positive active material as claimed in claim 1, wherein the phosphorus-containing compound includes lithium phosphate.

3. The positive active material as claimed in claim 1, wherein the phosphorus-containing compound includes $Li_3PO_4$, $Li_2HPO_4$, $LiH_2PO_4$, $LiMPO_4$, where M=Fe, Co, Mn, Ni, V, La, Ti, or Al, $(NH_4)_2HPO_4$, $(NH_4)H_2PO_4$, $AlPO_4$, $H_3PO_4$, or a combination thereof.

4. The positive active material as claimed in claim 1, wherein the lithium metal compound includes a lithium nickel-based oxide represented by Chemical Formula 1:

$$Li_xNi_yM_zO_2 \qquad \text{[Chemical Formula 1]}$$

wherein,

M is Co, Mn, Al, Mg, Ti, Zr, or a combination thereof, 0.95≤x≤1.00, 0.4≤y≤1.00, 0≤z≤0.6, and y+z=1.

5. A rechargeable lithium battery comprising the positive electrode including a positive active material as claimed in claim 1.

6. The positive active material as claimed in claim 1, wherein:

the positive active material is prepared by washing a first active material with an aqueous solution of a phosphorus (P)-containing material to obtain a second active material, the first active material includes the lithium metal compound and a lithium compound present on the surface of the lithium metal compound, the lithium metal compound being different from the lithium compound, and the second active material includes the lithium metal compound and the phosphorus-containing compound present on the surface of the lithium metal compound.

* * * * *